(12) United States Patent
Lodge et al.

(10) Patent No.: US 7,310,529 B1
(45) Date of Patent: Dec. 18, 2007

(54) PACKET DATA TRAFFIC CONTROL FOR CELLULAR WIRELESS NETWORKS

(75) Inventors: Richard A. Lodge, Ottawa (CA); Patrick Lie Chin Cheong, Nepean (CA)

(73) Assignee: Nortel Networks Limited, St. Laurent, Quebec (CA)

(*) Notice: Subject to any disclaimer, the term of this patent is extended or adjusted under 35 U.S.C. 154(b) by 0 days.

(21) Appl. No.: 09/489,929

(22) Filed: Jan. 24, 2000

(51) Int. Cl.
*H04Q 7/20* (2006.01)

(52) U.S. Cl. .......... 455/445; 455/67.11; 455/67.13; 455/423; 455/452.2; 370/252

(58) Field of Classification Search ......... 455/67.3, 455/67.1, 8–10, 450, 423, 512–517, 513, 455/422, 452, 426, 560–561, 557, 445, 68–69, 455/15, 455, 422.1, 501, 509–510, 452.1–452.2, 455/67.11, 67.13; 370/468, 329, 338, 348, 370/408, 252–253, 332, 407, 410, 401, 400; 709/224–227, 238; 375/220; 374/220
See application file for complete search history.

(56) References Cited

U.S. PATENT DOCUMENTS

| | | | |
|---|---|---|---|
| 5,383,221 A * | 1/1995 | Akita et al. ............. | 375/219 |
| 5,507,006 A * | 4/1996 | Knight .................... | 455/422.1 |
| 5,535,429 A * | 7/1996 | Bergenlid et al. ....... | 455/507 |
| 5,546,464 A * | 8/1996 | Raith et al. ............. | 380/272 |
| 5,592,225 A * | 1/1997 | Kurobe ................... | 375/240.03 |
| 5,636,230 A * | 6/1997 | Marturano et al. ...... | 714/748 |
| 5,729,542 A * | 3/1998 | Dupont ................... | 370/346 |
| 5,732,328 A | 3/1998 | Mitra et al. ............. | 455/69 |
| 5,745,480 A * | 4/1998 | Behtash et al. .......... | 370/252 |
| 5,752,193 A * | 5/1998 | Scholefield et al. ..... | 455/452 |
| 5,819,171 A * | 10/1998 | Hoogerwerf et al. .... | 455/410 |
| 5,822,300 A * | 10/1998 | Johnson et al. ......... | 370/229 |

(Continued)

FOREIGN PATENT DOCUMENTS

EP          597719 B1 *  5/1999

(Continued)

*Primary Examiner*—Pablo N. Tran
(74) *Attorney, Agent, or Firm*—Kent Daniels; Ogilvy Renault LLP

OTHER PUBLICATIONS

J. Zander—*Distributed Cochannel Interference Control in Cellular Radio Systems*, IEEE Trans. Vehic. Tech., v. 41(3), pp. 305-311 (Aug. 1992).

(57) ABSTRACT

Data traffic over a plurality of data communications links of a wireless data communications system is controlled by identifying a poorly performing wireless link, and interrupting data communications over the poorly performing link. The data throughput of remaining links between the transceivers is thus increased due to reduced interference and increased available band-width, because the poorly performing link is no longer transmitting. Interruption of data communications over the poorly performing link may be accomplished by suspending or dropping transmission of a frame. If a frame is predicted to be certain to violate quality of service (QoS) requirements, the frame may be preemptively suspended or dropped. If multiple frames are dropped within a predetermined period, a communications session over the poorly performing link may be dropped. Data communications over the poorly performing link can be resumed following a selected delay period, which may have a random length.

54 Claims, 2 Drawing Sheets

U.S. PATENT DOCUMENTS

| | | | | |
|---|---|---|---|---|
| 5,826,198 | A * | 10/1998 | Bergins et al. | 455/557 |
| 5,878,120 | A * | 3/1999 | O'Mahony | 379/93.09 |
| 5,926,767 | A * | 7/1999 | Olds et al. | 455/504 |
| 5,936,940 | A * | 8/1999 | Marin et al. | 370/232 |
| 5,937,349 | A * | 8/1999 | Andresen | 455/431 |
| 5,940,430 | A * | 8/1999 | Love et al. | 375/130 |
| 5,983,114 | A * | 11/1999 | Yao et al. | 455/509 |
| 6,011,778 | A * | 1/2000 | Kilkki et al. | 370/232 |
| 6,049,602 | A * | 4/2000 | Foladare et al. | 379/265.04 |
| 6,078,818 | A * | 6/2000 | Kingdon et al. | 455/456 |
| 6,081,727 | A * | 6/2000 | Kondo | 455/522 |
| 6,108,322 | A * | 8/2000 | Kotzin et al. | 370/333 |
| 6,111,909 | A * | 8/2000 | Taki | 375/132 |
| 6,128,507 | A * | 10/2000 | Takai | 455/524 |
| 6,131,049 | A * | 10/2000 | Marsan et al. | 455/574 |
| 6,173,184 | B1 * | 1/2001 | Kikuchi et al. | 455/445 |
| 6,175,744 | B1 * | 1/2001 | Esmailzadeh et al. | 455/522 |
| 6,178,330 | B1 * | 1/2001 | Alberty et al. | 455/452.2 |
| 6,195,346 | B1 * | 2/2001 | Pierson, Jr. | 370/352 |
| 6,201,971 | B1 * | 3/2001 | Purnadi et al. | 455/450 |
| 6,212,176 | B1 * | 4/2001 | Andersson et al. | 370/347 |
| 6,216,385 | B1 * | 4/2001 | Abe | 340/7.34 |
| 6,397,053 | B1 * | 5/2002 | Ghiazza | 455/343.1 |
| 6,456,605 | B1 * | 9/2002 | Laakso et al. | 370/330 |
| 6,560,207 | B1 * | 5/2003 | Kimura et al. | 370/324 |
| 6,603,972 | B1 * | 8/2003 | Sawyer | 455/442 |
| 6,603,975 | B1 * | 8/2003 | Inouchi et al. | 455/450 |
| 6,614,770 | B1 * | 9/2003 | Kayama et al. | 370/331 |
| 6,765,889 | B1 * | 7/2004 | Ludwig | 370/331 |

OTHER PUBLICATIONS

G.J. Foschini et al.—*A Simple Distributed Autonomous Power Control Algorithm and Its Convergence*, IEEE Trans. Vehic. Tech., v. 42(4), pp. 641-646 (Nov. 1993).

A.J. Viterbi—*CDMA-Principles of Spread Spectrum Communication*, ch. 4.7, pp. 113-119 (Addison-Wesley Pub. Co. 1995).

S.V. Hardy—*An Algorithm for Combined Cell-Site Selection and Power Control to Maximize Cellular Spread Spectrum Capacity*, IEEE J. Selected Areas in Comm., v. 13, No. 7, pp. 1332-1340 (Sep. 1995).

R.D. Yates—*A Framework for Uplink Power Control in Cellular Radio Systems*, IEEE J. Selected Areas in Comm., v. 13, No. 7, pp. 1341-1347 (Sep. 1995).

* cited by examiner

PACKET DATA TRAFFIC CONTROL FOR CELLULAR WIRELESS NETWORKS

CROSS-REFERENCE TO RELATED APPLICATIONS

This is the first application filed for the present invention.

MICROFICHE APPENDIX

Not applicable.

TECHNICAL FIELD

The present invention relates to wireless networks, and in particular to a method of increasing throughput of packetized data traffic over a wireless network.

BACKGROUND OF THE INVENTION

In recent years there has been an exponential increase in demand for wireless communication devices, which was initiated by the development of cellular telephones. Many new applications have been developed that use wireless devices for transmitting digital data. These applications include communications services such as electronic mail and text paging, wireless World Wide Web access, and wireless file transfer, etc. The use of digitally modulated radio signals, e.g. code division multiple access (CDMA), for packetized data transfer has generated a demand for faster transfer rates.

Digitally modulated radio signals are subject to degraded signal quality as a result of: multipath fading caused by reflections from environmental structures such as hilly terrain and/or buildings; doppler effects resulting from movement of mobile communications devices; channel interference; and background noise corruption. Multipath fading and doppler effects cause inter-symbol interference (ISI) which can undesirably affect performance during data transfer. Channel interference in which signals transmitted on one channel (carrier frequency) are detected as noise on other channels, results in similar degradation of data transfer performance. In extreme cases, a bit-error rate (BER) of a digital communications link can reach levels that are outside the permitted tolerance for acceptable or useful data communications.

Various methods have been proposed for maximizing the performance of wireless communications networks. For example, it is known to reduce channel interference by adjusting the transmission power of base stations and wireless terminals of the network. Conventional power control techniques typically adjust wireless terminal transmission powers based on a determination of the mean or average of the interference level detected at a base station. Examples of such power control techniques are provided by J. Zander, in "Distributed Cochannel Interference Control in Cellular Radio Systems," IEEE Trans. Vehic. Tech., b. 41 (3), pp. 305-311 (August 1992); by G. J. Foschini et al., in "A Simple Distributed Autonomous Power Control Algorithm and Its Convergence," IEEE Trans. Vehic. Tech., v. 42 (4), pp. 641-646 (November 1993); by A. J. Viterbi, in "CDMA-Principles of Spread Spectrum Communication," ch. 4.7, pp. 113-119 (Addison-Wesley Pub. Co. 1995); by S. V. Hardy, in "An Algorithm for Combined Cell-Site Selection and Power Control to Maximize Cellular Spread Spectrum Capacity," IEEE J. Selected Areas in Comm., v. 13, no. 7, pp. 1332-1340 (September 1995); and, by R. D. Yates, in "A Framework for Uplink Power Control in Cellular Radio Systems," IEEE J. Selected Areas in Comm., v.13, no. 7, pp. 1341-1347 (September 1995). However, the use of the simple mean of the received interference in determining the transmission power often produces a power level that is higher than necessary, causing higher than necessary levels of interference at the base stations. As a result, connection capacity in such systems are still overly limited. U.S. Pat. No. 5,732,328 (which issued to Mitra et al. on Mar. 24, 1998) teaches an alternative method, in which transmission power is controlled on a basis of an information class (i.e. voice, audio or data) of traffic on each link. The method taught by Mitra et al. permits further reductions in transmission power, with corresponding reductions in co-channel interference.

The above examples illustrate ongoing efforts to increase wireless data throughput by reducing channel interference. Each of these systems seek to minimize transmission power on every link, while maintaining acceptable performance in terms of session quality of service requirements on the link in question. Thus if any one or more of carrier-to-interference (C/I) ratio; the signal-to-noise (S/N) ratio; or bit error rate (BER) of any particular link falls outside of an acceptable range, then transmission power on that link is increased. However, that power increase may cause performance reductions on other links due to increased channel interference, while only being effective to recover marginal performance on the link in question. Consequently, conventional methods of reducing channel interference may have an effect of sacrificing data throughput on all links (and thus over-all data through-put) in an effort to maintain marginal data throughput on a small number of poorly-performing links.

Accordingly, a technique for controlling data traffic over a plurality of communications links of a wireless communications network which avoids unnecessarily diminishing overall network data throughput is highly desirable.

SUMMARY OF THE INVENTION

An object of the present invention is to provide a method of controlling data traffic in a wireless data communications network in which overall data throughput is increased by at least temporarily interrupting data transfer over poorly performing links of the network.

Accordingly, an aspect of the present invention provides a method of controlling data traffic in a wireless data communications system comprising a plurality of data communications wireless links, the method comprising the steps of: identifying a poorly performing wireless link; and at least temporarily interrupting data transmission over the poorly performing wireless link. By this means, interference caused by the poorly performing wireless link is eliminated, and overall data throughput on the remaining links of the wireless data communications system is improved.

Another aspect of the present invention provides a wireless data communications network comprising a base station capable of wireless communications with each of one or more wireless terminals over respective wireless links, the network comprising: computing means for identifying a poorly performing wireless link; and control means for at least temporarily interrupting data transmission over the poorly performing wireless link.

A further aspect of the present invention provides a base station of a wireless data communications network, the base station being adapted for bi-directional communications with each of one or more wireless terminals over respective wireless links, the base station comprising: computing means for identifying a poorly performing wireless link; and control means for at least temporarily interrupting data transmission over the poorly performing wireless link.

The computing means preferably comprises means for monitoring one or more performance parameters related to each wireless link, and comparing each monitored performance parameter to a respective predetermined tolerance range. The one or more performance parameters concerning each wireless link are preferably any one or more of a quality-of-service (QOS) metric, and interference on the link.

In an embodiment of the invention, at least one of the performance parameters related to each wireless link may be based on interference on the wireless link, and comprises any one or more of: a signal-to-noise (S/N) ratio; a carrier-to-interference (C/I) ratio; a bit-error-rate (BER) user data through-put rate; and a number of suspended frames. At least one of the performance parameters related to each wireless link may be an average, taken over a number n of successive bursts, of any one or more of the S/N ratio; the C/I ratio; the user data through-put; and the BER. The control means is preferably adapted to suspend transmission of a data frame over the poorly performing wireless link. Transmission of the data frame may be resumed after a delay period, which may have a random length.

The computing means may also be adapted to maintain a count of suspended frames. In that case, the control means is preferably adapted to suspend a communications session over the link if the number of suspended frames exceeds a predetermined threshold. The session may be restarted after a predetermined delay, which may have a random length.

In accordance with an embodiment of the invention, at least one of the performance parameters respecting each link is QOS performance parameter comprising any one or more of a data transmission delay, and a number of dropped frames. The control means is preferably adapted to drop a data frame transmitted over the poorly performing wireless link. The dropped frame may be retransmitted after a delay period, which may be a random delay.

The computing means may be adapted to maintain a count of dropped frames. In that case, the control means is preferably adapted to drop the session if the count of dropped frames exceeds a predetermined threshold.

Preferably, the computing means is adapted to predict whether a QOS performance parameter will fail to satisfy a QOS requirement for a communications session on the link. Similarly, the control means is adapted to preemptively drop a data frame being transmitted over the poorly performing wireless link.

An advantage of the present invention is that it can be implemented without making any changes to existing network infrastructure. Thus, the present invention provides a means for improving overall data throughput and quality of service at minimum cost to the network service provider.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
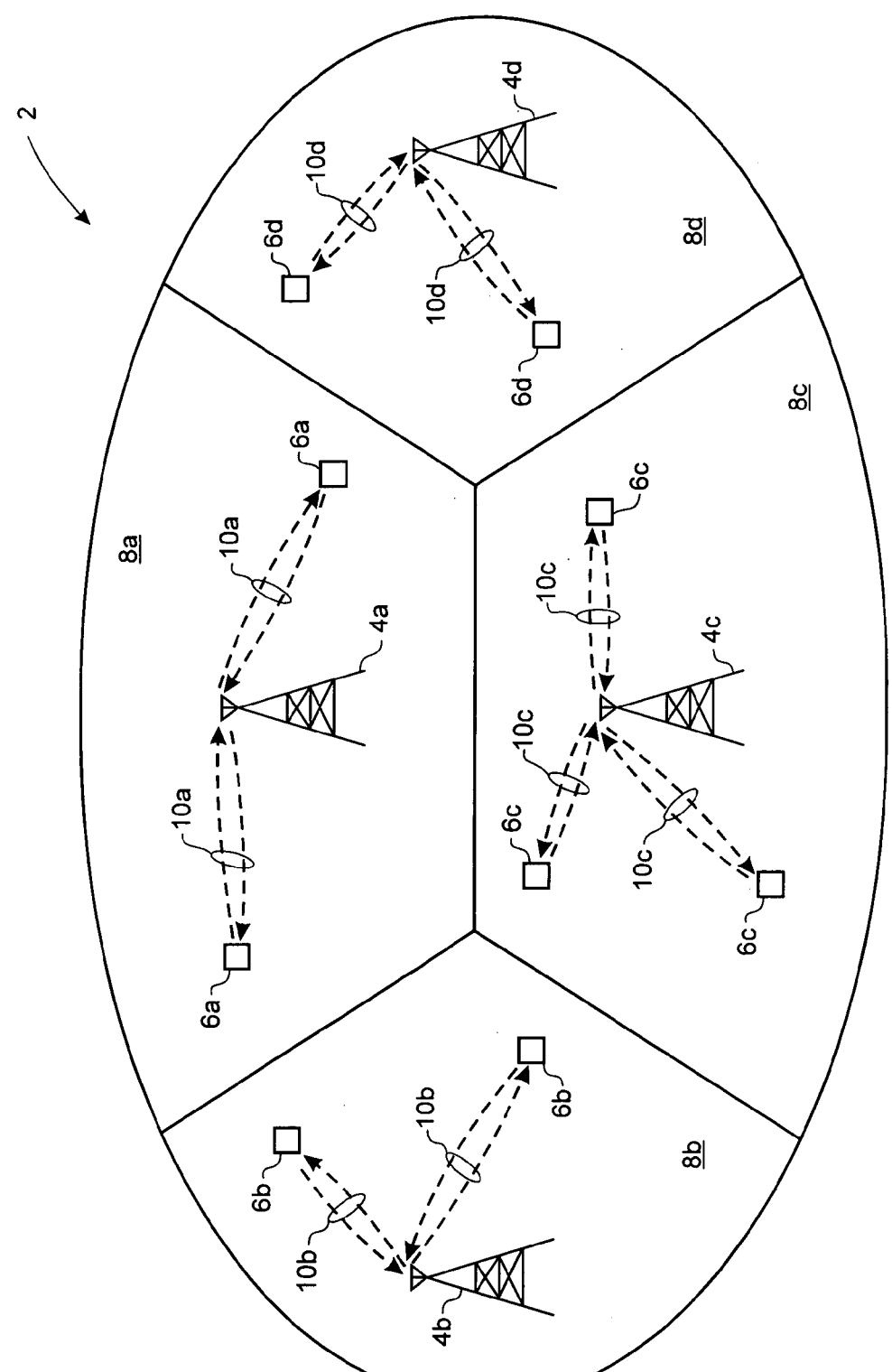
FIG. 1 is a schematic diagram illustrating an exemplary wireless communications network usable in conjunction with the present invention.

An exemplary wireless communication network 2 is shown in FIG. 1. The wireless network 2 includes a plurality of base stations 4a-4d linked to a fixed-link network (not shown) such as, for example, the Public Switched Telephone Network (PSTN), a broadband network employing asynchronous transfer mode (ATM) packet switching, or the Internet. Alternatively, the base stations 4 may be connected to such fixed-link networks through one or more intermediate bridging components such as a switching center (not shown).

The base stations 4 provide wireless communications services to wireless terminals 6a-d located within respective geographic service areas 8a-d (i.e. cells) proximate each respective base station 4a-d. Bi-directional data traffic between a base station 4 and a wireless terminal 6 within its respective cell 8 is handled by respective up-link and down-link paths of wireless data communications link 10. The size of each cell 8 may vary in accordance with the respective transmission power of each base station 4 and the environment in which each base station 4 is operating. Overlap regions (not shown) typically exist between adjacent cells 8 to enable hand-off between respective base stations 4. This ensures substantially uninterrupted communications of a mobile wireless terminal 6 as it travels across cell boundaries. Suitable overlap regions conform to those used in conventional wireless networks. The overlap regions are not shown for ease of illustration.

The base stations 4 are well known in the art and are commercially available from, for example, Nortel Networks. Similarly, the wireless terminals 6 can be, for example, mobile units, such as conventional cellular or PCS telephones, portable wireless modems for laptop computers, personal digital assistants (PDA's), or stationary units, such as wireless modems associated with desktop computers or multimedia devices. The wireless network 2 may also be a municipal area network (MAN) covering a large urban area, a small indoor network with a relatively small coverage area, such as an office building or a shopping mall, or a small outdoor network such as a University campus. The method of wireless communication employed by the network 2 is, for example, a spread spectrum digital communications technique including code division multiple access (CDMA), such as that adhering to the Telecommunication Industry Association Interim Standard 95. However, it is alternatively possible to use a time division multiple access (TDMA) scheme such as that adhering to the Telecommunication Industry Association Interim Standard 136, as well as other digital multiple access techniques.

The network 2 supports both delay tolerant and delay intolerant wireless communication sessions between base stations 4 and the wireless terminals 6. Exemplary delay intolerant sessions include, for example, voice, audio and video. Delay tolerant sessions including data transfers such as text or numerical information. Each session type typically has an associated service profile of quality of service (QoS) requirements, which may, for example, be expressed in terms of data transmission (i.e. packet or frame) delay tolerance by an end-user of a wireless terminal 6.

Data transmitted during an active communications session (i.e. between a base station 4 and wireless terminal 6 over a respective wireless link 10) is in Internet Protocol (IP)

packets encapsulated within one or more logical link control (LLC) frames. Other data protocols and transmission control formats may also be utilized. However, the present invention is particularly suitable for use in conjunction with wireless networks based on packet-switched transmission protocols.

In accordance with the present invention, data transmitted over poorly performing wireless links is intentionally dropped or suspended in order to improvise the overall throughput of the wireless (packet-switched) network. A packet transmission control algorithm is provided to identify and drop (or suspend) wireless links based on, for example, two preferred criteria: a quality of service (QOS) requirement violation, and an interference level on the link.

In the case of a QOS requirement violation, if a transmitted packet or frame has already violated the applicable QOS requirement, then it can be dropped. Alternatively, if it is predicted that the frame (or packet) is very likely to violate the QOS requirement, it can be preemptively dropped.

In the case of an interference level on the link, where the QOS is not a factor, the transmission of a frame or packet can be suspended if the current wireless link is determined to be of such poor quality that the predicted data throughput is below a predetermined threshold.

The intentional interruption of data communication on poorly performing links frees band-width for use by other links, and also reduces the interference in the system. Both of these effects result in increased overall data throughput of the network by increasing the performance of the remaining links, and these effects are cumulative.

The concept of dropping a call in a circuit-switched network is very different from that of dropping or suspending a packet or frame transmission in a packet-switched network. In the circuit-switched network, dropping a call implies that the link connection between the originating and terminating users is severed, whereas this is not necessarily true in the case of a dropped frame or packet in a packet-switched network. The dropping of a call in cellular wireless circuit-switched networks usually occurs in the radio link between the serving base station and the mobile user due to a harsh radio frequency (RF) environment. When designing such a system, one of the principal objectives is to minimize the number of dropped calls, which significantly affect the grade of service (GOS) offered to the users by the network provider. In wireless packet-switched network systems, however, the dropping or suspension of a radio link transmission does not automatically result in a breakdown of the connection between a server and a user. The parties to the communications session can still be connected via known logical set up links.

Figure 2:
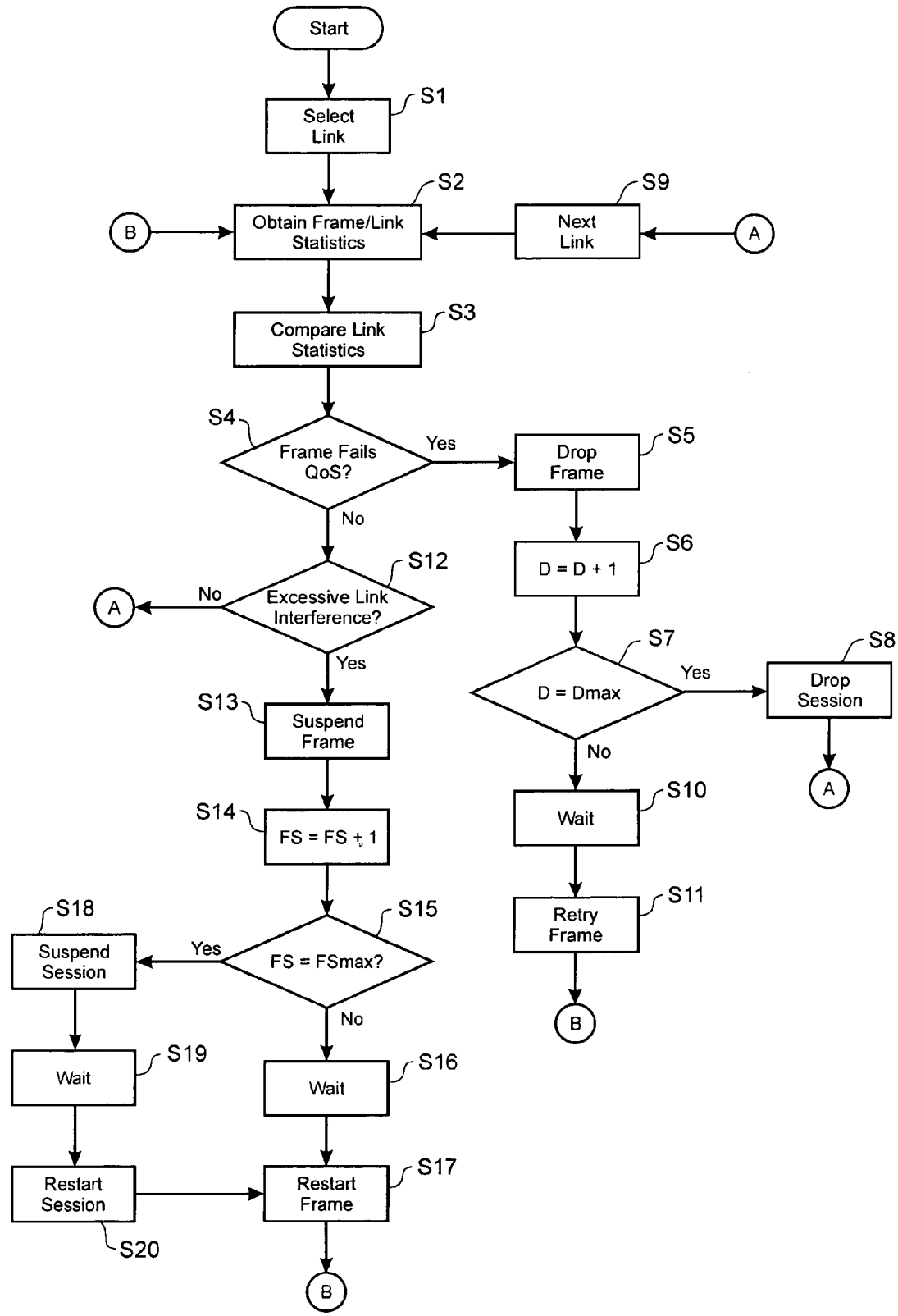
FIG. 2 is a flow chart illustrating exemplary steps in a process in accordance with the present invention.

FIG. 2 illustrates steps in an exemplary control algorithm for identifying and dropping and/or suspending data transmission over poorly performing data communications links in accordance with the present invention. The control algorithm is preferably instantiated during initialization of a base station 4, and runs concurrently with other communications processes. The process illustrated in FIG. 2 operates as follows.

At an initial step (step S1), a data communications link between the base station and a wireless terminal is selected for evaluation, and performance statistics related to the selected link are obtained (step S2). The performance statistics are preferably selected from among statistics normally collected by system management processes of the data communications network 2. These may include QOS-related statistics, such as for example a total frame delay time, as well as link quality statistics such as for example the BER, the S/N ratio, the user data throughput rate, and/or the C/I ratio.

The obtained statistics for the link are then compared with predetermined threshold values defining minimum acceptable link performance criteria (step S3).

At step S4 it is determined whether the frame being transmitted over the link has failed, or will fail, to meet the minimum QOS requirements. Various algorithms may be used to implement this determination. Two possible algorithms, where the QOS-related performance statistics are related to data transmission delay are described below.

A first exemplary QOS algorithm assumes that an IP packet is segmented and encapsulated in N LLC frames. The maximum time permitted to transmit each LLC frame of an IP packet is calculated and the respective transmit times are stored. During transmission of each LLC frame, if the LLC frame transmit timer surpasses the maximum transmit time, transmission of the IP packet is dropped (S5) and a counter (D) of IP packet drops for the selected link is incremented (S6).

Based on QoS requirements of the session, the maximum allowable delay for the transmission of an IP packet is $t_{ip,max}$, and the maximum data throughput for the user on the given link is $S_{max}$ bits/sec. Therefore, the minimum time (delay) for the transmission of the $j^{th}$ LLC frame is $$\min(t_{llc,j}) = \frac{\text{\#bits in } j\text{th LLC frame}}{S_{max}} \quad \text{(EQ 1)}$$

With this value known, the maximum allowable delay for the transmission of $n^{th}$ LLC frame can be determined from $$\max(t_{llc,n}) = \left[ t_{ip,max} - \sum_{i=1}^{n-1} t_{llc,i} - \sum_{j=n+1}^{N} \min(t_{llc,j}) \right] \quad \text{(EQ 2)}$$

If during the actual transmission of the nth LLC frame, the delay has already exceeded the above threshold (given by EQ 2), then the current LLC frame, and the remaining LLC frames of the IP packet can be dropped. This pre-emptive dropping of the IP packet is permissible because if the maximum allowable delay of the $n^{th}$ frame is violated, then the maximum delay tolerance of the IP packet is also certain to be violated, and there is no need to continue transmitting the remaining bits of the IP packet.

A second exemplary QOS algorithm assumes that an IP packet is encapsulated in a single LLC frame, which is generally the case. The LLC frame includes a plurality of RLC blocks, as is well known in the art. In this instance, the transmission of the LLC frame can be dropped based on an average throughput of the last m RLC blocks of the LLC frame. The rate at which the LLC frame is transmitted will vary depending on the C/I ratio.

If it takes $t_m$ seconds to transmit m RLC blocks, then (based on the transmissions of the most recent m RLC blocks) the average payload user data throughput can be determined from $$S_{avg} = \frac{\text{\#payload bits transmited by the } m \text{ RLC blocks}}{t_m} \quad \text{(Eq. 3)}$$

It should be noted that a delay $t_m$ includes the scheduling and decoding delays in addition to the transmission and retransmission delays. Given the average payload throughput, the time required to transmit the remaining payload bits of an LLC frame can be estimated.

To do so, the number of payload bits and the maximum delay tolerance for the LLC frame are denoted by K and $t_{llc,max}$ respectively. Assuming that i payload bits have been transmitted during $t_i$, the estimated time or delay to transmit the rest of the LLC frame, i.e. (K−i) bits, is $$t_{left} = \frac{\text{Remaining payload bits to be transmitted}}{S_{avg}} = \frac{(K-i)}{S_{avg}} \quad \text{(Eq. 4)}$$

The maximum allowable time (delay) remaining to transmit the LLC frame is given by $$t_{left,max} = t_{llc,max} - t_i \quad \text{(Eq. 5)}$$

Thus, if the current allowable delay $t_{left,max}$ is less than the predicted transmit delay $\tilde{t}_{left}$, that is, $$t_{left,max} < \tilde{t}_{left} \quad \text{(Eq. 6)}$$

then the LLC frame is preemptively dropped, because the frame is certain to fail the QoS requirements of the session. This check can be performed regularly, and as often as once after the transmission of each block, or after the transmission of every m RLC blocks.

It should be noted that there are many ways to estimate the average throughput $S_{avg}$ used to predict the transmission time of the LLC frame. The method represented by EQ 3 is just one example. Other methods can be based on a different function such as a weighted average of the past m RLC blocks, or as a function of a current C/I ratio and an expected number of active users in the system.

Returning now to FIG. 2, if it is determined at step S4 that the current frame has either failed (or is certain to fail) the applicable QOS requirements, then the current frame is dropped (step S5). In the case of a frame being transmitted by a wireless terminal 6 over an up-link path, dropping a frame can be accomplished by flushing data of the frame (or portion thereof) from buffers of the base station, and sending a control message to the corresponding wireless terminal 6 to terminate transmission of data of the dropped frame. In the case of a frame being transmitted to a wireless terminal 6 over a down-link path, dropping a frame can be accomplished by sending a control message to the wireless terminal 6 indicating that the frame has been dropped.

A dropped frame counter is then incremented (step S6) in order to track the number of dropped frames. The value stored in the dropped frame counter can then be compared to a threshold value ($D_{max}$) at step S7, to determine whether the number of frames dropped during the session (or during some other predetermined period of time) has exceeded an acceptable limit. If the result of the determination at step S7 is "yes", then the communications session over the selected link is dropped at step S8. Dropping the communications session may involve severing communications between parties to the communications session. After the session has been dropped at step S8, a new link is selected at step S9 and processing continues as described above from step S2 with respect to the new link. Alternatively, if it is determined at step S7 that the number of dropped frames has not exceeded the maximum threshold value ($D_{max}$), the system retries transmission of the dropped frame after a selected delay period (steps S10 and S11). Retransmission of the frame can be accomplished by sending a control signal to the wireless terminal 6 to begin sensing (or receiving) the previously dropped frame, starting again from the beginning of the frame. The delay period at step S10 may be a random delay. Once retransmission of the previously dropped frame has begun, the system returns to step S2 to obtain and process performance statistics concerning the frame and the link.

If at step S4 it is determined that the frame will not fail the applicable QOS requirements, the system proceeds to step S12 where it is determined whether excessive interference is being detected on the link. This determination is conveniently based upon any one or more of the BER, the S/N ratio, the user data throughput rate, and the C/I ratio. If the link interference is determined not to be excessive at step S12, the system returns to step S9 to select and analyze a new link. If excessive interference is found at step S12, however, the frame is suspended (at step S13). Suspension of the frame can be accomplished by sending a control signal to the wireless terminal 6 to indicate that the sending of bits of the frame is to be stopped, but already received bits are retained within memory.

A frame suspended counter is then incremented (at step S14) to count the number of frame suspensions within a predetermined time period, such as, for example, the duration of a communications session. At step S15 it is determined whether the number of frame suspensions exceeds a predetermined threshold value ($FS_{max}$). If the threshold has not been exceeded, the suspended frame is restarted after a predetermined delay (steps S16 and S17). Restarting the frame can be accomplished by sending a control signal to the wireless station 6 to indicate that the sending of bits of the frame to the base station 4 should resume, starting from a point at which the frame was suspended. The delay period at step S16 can be a random delay, and may be the same or different from the delay period at step S10. Following restart of the frame at step S17, the system returns to step S2 to obtain updated performance statistics for the frame and the link and then continues processing of the frame as described above.

If at step S15 it is determined that the number of frame suspensions exceeds the threshold $FS_{max}$, then the communications session is suspended (at step S18). As with suspension of a frame, suspension of a session can be accomplished by sending a control signal to the wireless terminal 6, while retaining already received data for the session in memory. The suspended session can then be restarted (step S20) by sending an appropriate control signal to the wireless terminal 6 after a predetermined delay (step S19), prior to restarting the frame (step S17). Once again, the delay period at step S19 may be a random delay, and may be the same or different from the delay periods at steps S10 and S16.

The embodiment(s) of the invention described above is (are) intended to be exemplary only. The scope of the invention is therefore intended to be limited solely by the scope of the appended claims.

We claim:

1. A method of controlling data traffic in a wireless data communications network comprising a plurality of wireless terminals and a base station, each wireless terminal being adapted for bi-directional data communication with the base station through a respective bi-directional wireless data communications link, the method comprising steps of, at the base station:
  a) examining performance of each wireless link to identify a poorly performing wireless link; and
  b) temporarily interrupting bi-directional data transmission over the poorly performing wireless link.

2. A method as claimed in claim 1, wherein the step of examining performance of the wireless links comprises steps of monitoring one or more performance parameters related to each wireless link, and comparing each monitored performance parameter to a respective predetermined threshold value.

3. A method as claimed in claim 2, wherein the one or more performance parameters related to each wireless link are based on any one or more of a quality-of-service (QOS), and interference on the wireless link.

4. A method as claimed in claim 3, wherein at least one of the performance parameters related to each wireless link is based on interference on the wireless link, and comprises any one or more of: a signal-to-noise (S/N) ratio; a user data throughput rate; a carrier-to-interference (C/I) ratio; a bit-error-rate (BER); and a number of suspended frames.

5. A method as claimed in claim 4, wherein at least one of the performance parameters related to each wireless link comprises an average, taken over a number n of successive bursts, of any one or more of the S/N ratio; the C/I ratio; the user data throughput rate; and the BER.

6. A method as claimed in claim 3, wherein at least one of the performance parameters related to each wireless link is a QOS performance parameter 7. A method as claimed in claim 6, further comprising maintaining a count of dropped frames.

8. A method as claimed in claim 7, further comprising a step of dropping the session if the number of dropped frames exceeds a predetermined threshold.

9. A method as claimed in claim 6, wherein the step of monitoring a respective performance parameter respecting each wireless link comprises a step of predicting whether a QOS performance parameter is certain to violate a corresponding QOS requirement of a communications session on the link.

10. A method as claimed in claim 9, wherein the step of interrupting data transmission over the poorly performing wireless link comprises a step of preemptively dropping a data frame being transmitted over the poorly performing wireless link.

11. A method as claimed in claim 1, wherein the step of interrupting data transmission over the poorly performing wireless link comprises a step of suspending transmission of a data frame over the poorly performing wireless link.

12. A method as claimed in claim 11, further comprising a step of resuming transmission of the data frame after a delay period.

13. A method as claimed in claim 12, wherein the delay period is a period of random length.

14. A method as claimed in claim 11, further comprising maintaining a count of suspended frames.

15. A method as claimed in claim 14, further comprising suspending a communications session over the wireless link if the count of suspended frames exceeds a predetermined threshold.

16. A method as claimed in claim 15, further comprising restarting the session after a delay period.

17. A method as claimed in claim 16, wherein the delay period is of random length. comprising any one or more of a data transmission delay, and a number of dropped frames.

18. A method as claimed in claim 1, wherein the step of interrupting data transmission over the poorly performing wireless link comprises a step of dropping a data frame transmitted over the poorly performing wireless link.

19. A method as claimed in claim 18, further comprising a step of re-transmitting the dropped frame after a delay period.

20. A method as claimed in claim 19, wherein the delay period is a period of random length.

21. A wireless data communications network comprising a base station capable of bi-directional data communication with each one of a plurality of wireless terminals over respective bi-directional wireless data communications links, the base station comprising:
  a) computing means for examining performance of each wireless link of the network to identify a poorly performing wireless link; and
  b) control means for temporarily interrupting bi-directional data transmission over the identified poorly performing wireless link.

22. A network as claimed in claim 21, wherein the computing means comprises means for monitoring one or more performance parameters related to each wireless link, and comparing each monitored performance parameter to a respective predetermined tolerance.

23. A network as claimed in claim 22, wherein the one or more performance parameters related to each wireless link are based on any one or more of a quality-of-service (QOS), and interference on the wireless link.

24. A network as claimed in claim 23, wherein at least one of the performance parameters related to each wireless link is based on interference on the link, and comprises any one or more of: a signal-to-noise (S/N) ratio; a carrier-to-interference (C/I) ratio; a bit-error-rate (BER); a user data throughput rate; and a number of suspended frames.

25. A network as claimed in claim 24, wherein at least one of the performance parameters related to each wireless link comprises an average, taken over a number n of successive bursts, of any one or more of the S/N ratio; the C/I ratio; the user data throughput rate; and the BER.

26. A network as claimed in claim 23, wherein at least one of the performance parameters concerning each wireless link is a QOS performance parameter comprising any one or more of a data transmission delay, and a number of dropped frames.

27. A network as claimed in claim 26, wherein the control means is adapted to drop a data frame transmitted over the poorly performing wireless link.

28. A network as claimed in claim 27, further comprising means for re-transmitting the dropped frame after a delay period.

29. A network as claimed in claim 28, wherein the delay period is a period of random length.

30. A network as claimed in claim 26, wherein the computing means is adapted to maintain a count of dropped frames.

31. A network as claimed in claim 30, wherein the control means is adapted to drop the session if the count of dropped frames exceeds a predetermined threshold.

32. A network as claimed in claim 26, wherein the computing means is adapted to compute a probability respecting whether the QOS performance parameter in certain to violate a corresponding QOS requirement of a communications session on the link.

33. A network as claimed in claim 32, wherein the control means is adapted to preemptively drop a data frame being transmitted over the poorly performing wireless link.

34. A network as claimed in claim 21, wherein the control means is adapted to suspend transmission of a data frame over the poorly performing wireless link.

35. A network as claimed in claim 34, further comprising means for resuming transmission of the data frame after a delay period.

36. A network as claimed in claim 35, wherein the delay period is a period of random length.

37. A network as claimed in claim 34, wherein the computing means is further adapted to maintain a count of suspended frames.

38. A network as claimed in claim 37, wherein the control means is adapted to suspend a communications session over the wireless link if the count of suspended frames exceeds a predetermined threshold.

39. A network as claimed in claim 38, further comprising means for restarting the session after a delay period.

40. A network as claimed in claim 39, wherein the delay period is of random length.

41. A base station of a wireless data communications network, the base station being adapted for bi-directional data communications with each one of a plurality of wireless terminals over respective bi-directional wireless communications links, the base station comprising:
   a) computing means for examining performance of each wireless link of the network to identify a poorly performing wireless link; and
   b) control means for temporarily interrupting bidirectional data transmission over the identified poorly performing wireless link.

42. A base station as claimed in claim 41, wherein the computing means comprises means for monitoring one or more performance parameters related to each wireless link, and comparing each monitored performance parameter to a respective predetermined tolerance.

43. A base station as claimed in claim 42, wherein the one or more performance parameters related to each wireless link are based on any one or more of a quality-of-service (QOS), and interference on the link.

44. A base station as claimed in claim 43, wherein at least one of the performance parameters related to each wireless link is based on interference on the link, and comprises any one or more of: a signal-to-noise (S/N) ratio; a user data throughput rate; a carrier-to-interference (C/I) ratio; a bit-error-rate (BER); and a number of suspended frames.

45. A base station as claimed in claim 44, wherein at least one of the performance parameters related to each wireless link comprises an average, taken over a number n of successive bursts, of any one or more of the S/N ratio; the C/I ratio; the user data throughput rate; and the BER.

46. A base station as claimed in claim 44, wherein the control means is adapted to suspend transmission of a data frame over the poorly performing wireless link.

47. A base station as claimed in claim 46, wherein the computing means is further adapted to maintain a count of a number of suspended frames.

48. A base station as claimed in claim 47, wherein the control means is adapted to suspend a communications session over the link if the count of suspended frames exceeds a predetermined threshold.

49. A base station as claimed in claim 43, wherein at least one of the performance parameters related to each wireless link is a QOS performance parameter comprising any one or more of a data transmission delay, and a number of dropped frames.

50. A base station as claimed in claim 49, wherein the control means is adapted to drop a data frame transmitted over the poorly performing wireless link.

51. A base station as claimed in claim 50, wherein the computing means is adapted to maintain a count of dropped frames.

52. A base station as claimed in claim 51, wherein the control means is adapted to drop the session if the count of dropped frames exceeds a predetermined threshold.

53. A base station as claimed in claim 49, wherein the computing means is adapted to compute a probability respecting whether the QOS performance parameter is certain to violate a corresponding QOS requirement of a communications session on the wireless link.

54. A base station as claimed in claim 53, wherein the control means is adapted to preemptively drop a data frame being transmitted over the poorly performing wireless link.

* * * * *